J. G. SAWYER.
TROTTING HARNESS.
APPLICATION FILED AUG. 27, 1920.
1,366,497.
Patented Jan. 25, 1921.
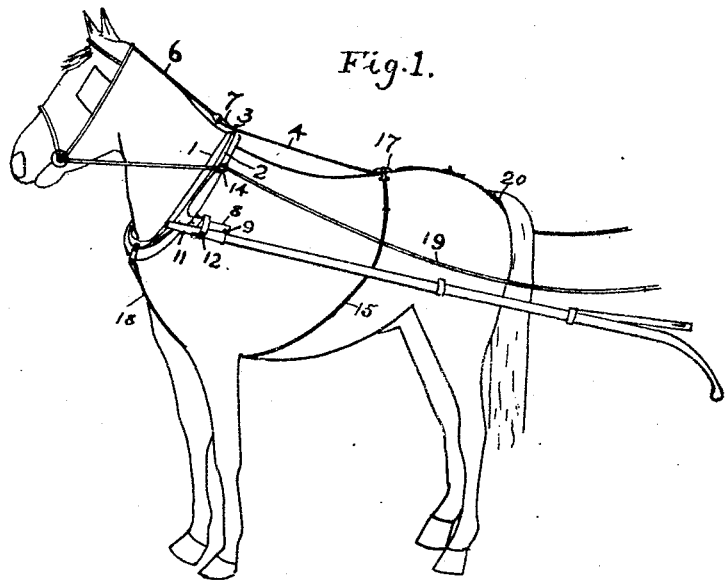
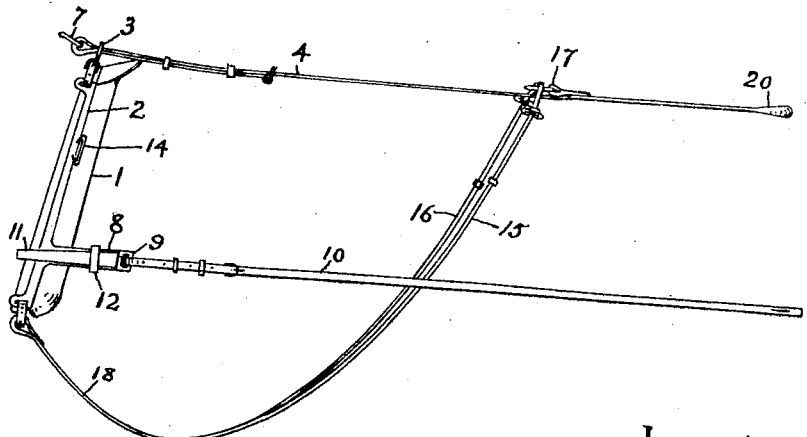
Inventor:
John G. Sawyer
by S. W. Bates
Atty.

UNITED STATES PATENT OFFICE.

JOHN G. SAWYER, OF PORTLAND, MAINE.

TROTTING-HARNESS.

1,366,497. Specification of Letters Patent. Patented Jan. 25, 1921.

Application filed August 27, 1920. Serial No. 406,370.

*To all whom it may concern:*

Be it known that I, JOHN G. SAWYER, a citizen of the United States, residing at 33 Fessenden St., Portland, in the county of Cumberland and State of Maine, have invented certain new and useful Improvements in Trotting-Harness, of which the following is a specification.

My invention relates to a trotting harness for horses by which the muscular movements of the horse when attached to the trotting sulky are rendered free and unobstructed.

The common form of harness for horses includes a girth which passes around the chest for holding up the thills, a breast plate for taking the pull of the traces and breeching for backing or reversing the forward motion of the vehicle.

These elements of the harness all have more or less tendency to interfere with the free muscular action of the horse when trotting. The breast plate draws directly across the shoulders, the girth compresses the ribs and interferes with the action of the lungs and the breeching is constantly in contact with the hind legs.

The object of my invention is to construct a harness which will hold and guide the thills and the sulky but will at the same time leave the horse perfectly free in his movements as though he was trotting without any harness.

To accomplish this result, I make use of a light collar and hames attaching all the parts of the harness to this member. The thills are attached directly at their ends and the rear movement is provided for by connecting the crupper to the lower end of the collar by a split or bifurcated martingale which, starting from the crupper passes down around the body of the horse, thence between his fore legs and is secured to the lower end of the collar.

The collar rests lightly on the rear portion of the neck, and on the shoulders of the horse when the latter is not trotting, the upper end of the collar being free to move lengthwise of the horse by having a loop through which a back strap passes thus allowing free movement of the collar. Thus, when the horse is under way, the collar is thrown away from the shoulders, hanging suspended from the rear portion of the back of the neck.

When the horse is checked or backed, a backward pull is exerted on the bottom of the collar acting through the crupper and martingale and thence to the thills without interfering in any way with the hind legs. The shoulders, the chest and the hind legs are entirely free and the horse is practically as free as if he was unharnessed.

I have illustrated my invention by means of the accompanying drawing in which:

Figure 1 is a perspective view of a horse harnessed in a trotting sulky and,

Fig. 2 is a perspective view of the harness without the horse.

Referring to the drawing:

1 represents the collar which is preferably of light construction and 2 is the hames preferably of cast aluminum to make it as light as possible. The collar and hames constitute a single element of the harness. The hames have at the upper end a loop 3 through which passes a back strap 4 secured at its rear end to the crupper 20.

The overhead draw check rein 6 connects with the forward end of the back strap with a hook 7 which acts as a stop to prevent the top of the collar from moving forward of the junction of the back strap and check rein.

The thills and traces are secured to the lower end of the hames and for this purpose as here shown, I form a projection 8 on the hame extending rearwardly a short distance with a ring or loop 9 in the rear to which the trace 10 is secured. A socket 11 for the reception of the end of the thill is secured to the projection 8 by means of a strap 12. The hame is provided with the usual turrets 14 for the passage of the driving reins 19.

The rearward or backing motion of the horse is taken care of by a bifurcated martingale secured to the back strap 4 at 17 forward of the crupper 20 or to what may be regarded as a forward extension of the crupper.

The straps 15 and 16 into which the rear portion of the martingale is divided extend down around the sides of the horse uniting in a single strap 18 which passes between the fore legs and is secured to the lower end of the collar 1.

Thus, any rearward pull on the harness by backing the sulky or pulling on the reins will be transmitted from the crupper to the lower end of the collar and will hold the latter down against or just forward of the horse's shoulders.

A harness constructed as described will enable a trotting horse to make several seconds better time than with an ordinary harness in a race as it will practically free the muscles from any interference with the harness.

I claim:

1. In a trotting harness, the combination of a collar, means for fastening the thills and traces to the collar, a crupper and a two part martingale secured to the crupper and extending downward, one part of said martingale on each side of the horse and thence between the horse's fore legs and being secured to said collar.

2. In a trotting harness, the combination of a collar, and hames, means for fastening the thills and traces to the hames, a crupper and a two part martingale secured to said crupper and extending downwardly, one part of said martingale on each side of the horse and thence between the horse's fore legs and being secured to the collar.

3. In a trotting harness, the combination of a collar, means for fastening the traces and the thills to said collar, a back strap and overhead check secured together, a loop in the collar through which said back strap passes, a crupper and a two part martingale secured to said crupper and having one part of said martingale extending downward on each side of the horse and thence passing between the horse's fore legs and connecting with the collar.

4. In a trotting harness, the combination of a collar and hames, a rearward projection formed on each of said hames, a socket for receiving the end of the shaft and a trace secured to each of said projections, a back strap and overdraw check and crupper secured together, a loop in the hames through which the back strap passes and a bifurcated martingale secured to the crupper and extending downwardly and forwardly, one half of each side of the horse, thence between the horse's fore legs and being secured to the collar.

5. In a trotting harness, the combination of a collar and hames, a rearward projection formed on each of said hames, a socket for receiving the end of the thills and a trace secured to each of said projections, a crupper, a bifurcated martingale secured to said crupper and extending downward, one part of said martingale on each side of the horse's body and thence passing between the fore legs and being secured to the collar.

JOHN G. SAWYER.